Jan. 10, 1956  E. A. FARR ET AL  2,730,610
PERCOLATOR

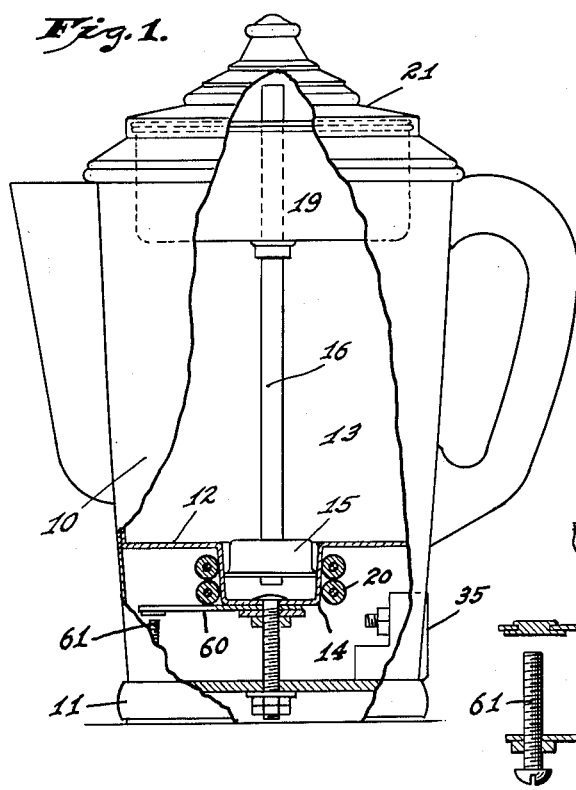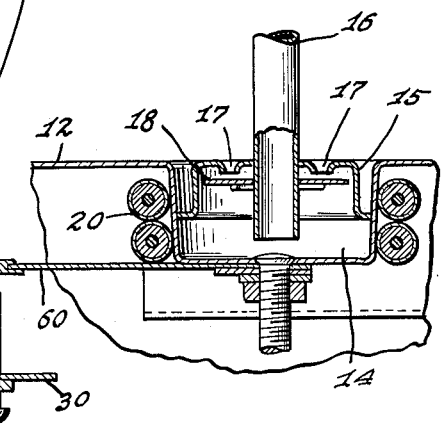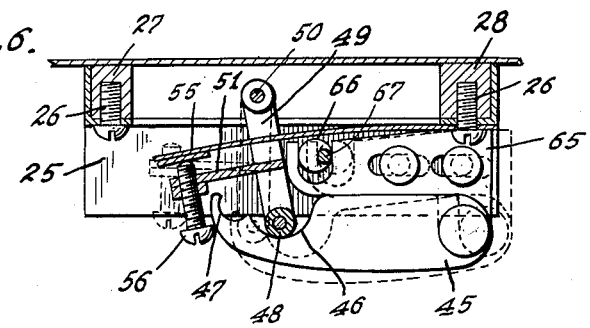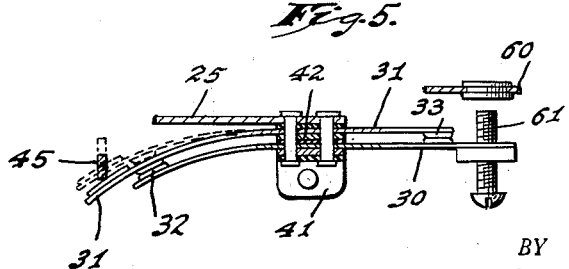

Filed June 4, 1951  2 Sheets-Sheet 2

Fig. 2.

Fig. 3.

INVENTORS
JOHN P. THEISEN and
BY EDWARD A. FARR,

ATTORNEYS.

United States Patent Office 2,730,610
Patented Jan. 10, 1956

2,730,610

PERCOLATOR

Edward A. Farr and John P. Theisen, Columbus, Ind., assignors to Arvin Industries, Inc., Columbus, Ind., a corporation of Indiana Application June 4, 1951, Serial No. 229,698

4 Claims. (Cl. 219—44)

This invention relates to electrically heated coffee percolators and has for its primary object the provision in such a percolator of means which will function automatically to terminate percolation when the coffee has attained any desired degree of strength and irrespective of the quantity of coffee being made. Another object of the invention is to provide in such a percolator a means which will function, after brewing of the coffee has terminated, to maintain the coffee at any desired temperature without causing any further percolation. Still another object of the invention is to effect the aforesaid automatic controls with apparatus of simple design and construction and without the necessity for any auxiliary heating elements.

In carrying out the invention in its preferred form, I employ a percolator embodying the usual well, an electrical resistance heating element for heating the liquid in such well to a temperature above its boiling point, and a tube for elevating liquid forced from the well and discharging such liquid over ground coffee in an elevated basket. In series with the electrical resistance element and in parallel with each other I provide main and auxiliary switches either of which, when closed, provides for the supply of current to the heating element. The main switch is biased toward open position and has an associated, manually actuated latch mechanism for maintaining it closed, such latch mechanism being releasable by a temperature-responsive element responsive generally to the temperature of the brewed coffee and operative when the temperature of the brewed coffee has attained a predetermined maximum to release the latch and permit opening of the main switch. The auxiliary switch is under the control of a temperature-responsive element responsive to the temperature of the well and operative when the well-temperature attains a predetermined maximum to open the auxiliary switch. The well-temperature at which the auxiliary switch opens is below the boiling point of water, and when the main switch is opened, closing of the auxiliary switch can therefore never result in causing liquid in the well to boil. The latch which maintains the main switch closed is manually settable through the medium of a movable member whose position gives visible indication as to whether the main switch is open or closed.

The accompanying drawings illustrate the invention: Fig. 1 is a side elevation of a complete percolator with portions thereof broken away to illustrate the interior construction; Fig. 2 is a vertical section through the base of the percolator illustrating in elevation the automatic control mechanism; Fig. 3 is a horizontal section through the percolator immediately above the base and below the operating mechanism showing such operating mechanism in a bottom plan view; and Figs. 4, 5, and 6 are vertical sections respectively on the lines 4—4, 5—5, and 6—6 of Fig. 3.

The percolator shown in the drawing comprises an appropriately shaped, open-topped metal shell 10 mounted on a base 11 and having above such base a bottom 12 defining the lower end of a liquid-containing compartment 13. The bottom 12 has a central depressed portion providing a well 14 which receives a closure 15 having a peripheral rim seating in sealing relationship with the side wall of the well. The closure 15 is fixedly mounted on and adjacent the lower end of a tube 16 and is provided with an annular series of inlet openings 17 through which liquid from the compartment 13 can enter the well. Mounted for free vertical movement on the tube 16 is a valve member 18 which can be forced upwardly by fluid pressure within the well 14 to close the openings 17 and cause liquid in the well to be displaced upwardly through the tube 16 as a result of such fluid pressure. At the top of the tube is a conventional basket 19 which is adapted to contain ground coffee and into which liquid expelled from the upper end of the tube 16 spills over. The basket 19 has perforated bottom and side walls permitting the water discharged into the basket to escape into the compartment 13 after passing through the ground coffee which the basket 19 contains. An electrical resistance heating element 20 is associated in heat-transmitting relationship with the well 14. Conveniently, such heating element is in the form of an encased high-resistance rod wrapped for one or two turns around the well. The upper end of the shell 10 is closed by a removable cover or lid 21.

The brewing operation which occurs in a percolator of the type so far described will be obvious. When water is placed in the compartment 13, some of it passes through the openings 17 to fill the well 14. Raised in temperature by heat from the heating element 20, the water in the well 14 reaches the boiling point, and fluid pressure within the well is increased first to cause the valve 18 to move upwardly and close the openings 17 and second to displace unvaporized liquid upwardly through the tube 16 and into the basket 19. As soon as fluid pressure within the well 14 drops as a result of the escape of liquid upwardly through the tube 16, the valve 18 moves downwardly to permit the well 14 again to be filled. As this operation is repeated, the ground coffee in the basket 19 becomes extracted by the continual passage of liquid through it.

The mechanism employed to effect automatic control of the brewing operation is located within the lower portion of the shell 10 below the bottom 12 and above the base 11. As shown, such mechanism is mounted on a sheet-metal bracket 25 attached by screws 26 to bosses 27 and 28 secured to the bottom 12 at points spaced from the well 14. To the bottom of the bracket 25 there are secured the intermediate points of two parallel switch-leaves 30 and 31 having at their opposite ends pairs of contacts 32 and 33 adapted to be moved into and out of engagement by the flexing of one or the other of the leaves 30 and 31. Mounted on the base 11 is a block of insulating material 35 carrying two terminals 36 and 37 adapted for connection to a suitable source of electric current. As will be clear from Fig. 3, the terminal 36 is connected to one end to the heating element 20 through the switch-leaves 30 and 31 and conductors 38 and 39 while the other terminal 37 is connected directly to the opposite end of the heating element 20 through a conductor 40. Conveniently, the two switch-leaves 30 and 31 are held in conductive engagement respectively with L-shaped connectors 41 and 42 to which the conductors 38 and 39 are secured.

It will be evident from the construction as described that the two pairs of contacts 32 and 33 constitute switch means for controlling connection of the heating element 20 to the terminals 36 and 37. Specifically, the two pairs of contacts are in parallel with each other and in series with the heating element so that the heating element is energized whenever either pair of contacts is in engagement. Hereinafter, the contacts 32 will be referred to as the main switch and the contacts 33 as the auxiliary switch.

The main switch 32 is normally open but is adapted to be closed by downward flexing of the upper spring leaf 31. The means employed to effect such downward flexing of the leaf 31 is illustrated in Figs. 2 and 5. As there illustrated, a switch-controlling arm 45 is pivotally supported from the bracket 25 on a horizontal axis in such a position that its free end lies above the spring leaf 31. In its upper edge and near its free end, the arm 45 is provided with a pair of radially spaced notches 46 and 47 adapted alternatively to receive a roller 48 mounted on the lower end of a latch member 49 which, at its upper end, is pivotally supported from the bracket 25 as indicated at 50. As will be clear from comparison of the full-line and dotted-line showings of the arm 45 in Fig. 2, the notch 47 is shallow enough that when the roller 48 is positioned in it the free end of the arm 45 will be forced downwardly to depress the adjacent end of the spring leaf 31 and close the switch 32. The notch 46 is substantially deeper than the notch 47 so that when the roller 48 is positioned in the notch 46 the end of the spring leaf 31 can move upwardly unopposed to permit the main switch 32 to open.

For the purpose of controlling the position of the latch 49, it is provided with a lateral extension 51, and rigid with such extension there is a member 52 which projects outwardly through a slot 53 in the side wall of the shell 10 where it is desirably provided with an appropriate knob 52'. By upward pressure applied to the knob 52', the latch 49 can be swung from the dotted-line to the full-line position shown in Fig. 2 to force the free end of the arm 45 downward, depress the adjacent end of the spring-leaf 30, and close the switch 32.

Means to effect automatic opening of the switch 32 upon completion of the brewing operation takes the form of a bimetallic strip 55 (Figs. 2, 3, and 6) secured at one end to the boss 28 and having its free end positioned above an adjusting screw 56 mounted in the latch-extension 51. The bimetallic strip 55 is arranged to flex downwardly upon an increase in the temperature to which it is subjected, engage the screw 56, and swing the latch member 49 in a counterclockwise direction to move the roller 48 out of the notch 47 and into the notch 46.

The auxiliary switch 33 is biased toward closed position and arranged to be opened under the control of a bimetallic strip 60 secured in relatively close heat-receiving relationship to the heating element 20. Conveniently the element 60 is mounted in contact with a wall, desirably the bottom wall, of the well 14. The free end of the bimetallic strip 60 is disposed above the end of an adjusting screw 61 mounted in the lower switch-leaf 30. The bimetallic strip 60 is arranged to flex downwardly upon an increase in the temperature to which it is responsive, engage the screw 61, and move the lower spring-leaf 30 downwardly to open the switch 33.

To operate the device described, the desired amount of water is placed in the compartment 13, a proportionate quantity of ground coffee is placed in the basket 19, and with the closure 15 seated in the well 14 and the cover 21 in place, the terminals 36 and 37 are connected through suitable conductors (not shown) to an appropriate source of electric current. At the low-temperature conditions existing at the beginning of the brewing operation, the bimetallic strip 55 occupies the full-line position shown in Fig. 2, and the bimetallic strip 60 occupies the position indicated in Fig. 4. To initiate the brewing operation, the knob 52' is manipulated to swing the latch member 49 from the dotted-line position to the full-line position shown in Fig. 2, thus causing the roller 48 to move into the notch 47, depress the arm 45, and close the switch 32. Flow of current through the heating element 20 heats the well 14 and causes the percolating action above described to take place. The bimetallic strip 60 flexes downwardly to open the switch 33 before liquid in the well 14 reaches the boiling point, and the switch 33 thereafter remains open, current being supplied to the heating element through the closed switch 32. As percolation continues, the temperature of liquid in the compartment 13 gradually rises. Such temperature is transmitted to the bimetallic strip 55 through the boss 28 to which it is secured, and when the body of liquid in the compartment 13 attains a predetermined temperature fixed by the characteristics of the bimetallic strip 55 and the adjustment of the screw 56, the bimetallic strip swings the latch member in a counterclockwise direction (Figs. 2 and 5) to bring the roller 48 above the deep notch 46 and permit the upper spring-leaf 31 to rise and open the switch 32, thus terminating the supply of current to the heating element 20. The bimetallic strip 60, which has been heated by reason of its close association with the heating element 20 and well 14 begins to move upwardly almost immediately upon the termination of the supply of current to the heating element 20, and eventually moves up far enough to permit closing of the switch 33 and re-energization of the heating element. Before liquid in the well 14 can boil as a result of the resumed energization of the heating element, the bimetallic strip 60 again moves downwardly to open the switch 33. The bimetallic strip 60 and switch 33 therefore function to maintain the body of liquid in the compartment 13 at a predetermined elevated temperature determined by adjustment of the screw 61. Thus, the brewed coffee is kept hot as long as the terminals 36 and 37 remain connected to the supply of electric current.

Once the latch member 49 has moved into the full-line position shown in Fig. 6, any further movement of the bimetallic strip 55 in either direction is without effect on the switch 32. When the connection between the terminals 36—37 and the supply of current is severed so that closing of the switch 33 will no longer result in energization of the heating element 20, the entire structure cools and the bimetallic strip 55 returns to its elevated position shown in full lines in Fig. 2, the latch member 49, arm 52 and knob 52' remaining in the position indicated in full lines in Fig. 4 and in dotted lines in Fig. 2. The movement of the knob 52' which accompanies movement of the latch member from operative to inoperative position upon termination of percolation constitutes a visible indication that the brewing operation has been completed and the coffee ready to serve.

We have found that, if the proper ratio is maintained between the quantity of water placed in the compartment 13 and the quantity of ground coffee placed in the basket 19, the temperature of the body of brewed coffee in the compartment 13 will indicate the strength of the brew, irrespective of the quantity of water initially placed in the compartment 13. As heat is given off from the heating element 20 at a substantially constant rate, the time required to raise a body of liquid in the compartment 13 to any given temperature will be roughly proportional to the quantity of that liquid. By making the latch-release mechanism responsive to the temperature of the body of brewed coffee as a whole, the duration of the percolating period will be automatically proportional to the quantity of coffee being brewed and at the attainment of latch-releasing temperature the brew will always have approximately the same strength.

Although it may be unnecessary to adjust the timing mechanism comprising the bimetallic strip 55, latch member 49, arm 45, and switch 32 to take account of variations in the quantity of coffee being brewed, some adjustment of such mechanism is frequently desirable in order that the strength of the brew may be varied to suit individual tastes. This end can be accomplished by varying the temperature at which the bimetallic strip 55 functions to release the latch member 49. In the device shown in the drawing, in order to attain that end, the arm 45 is not directly pivoted on the bracket 25 but instead is pivoted on a carriage 65 supported from the bracket 25 for sliding movement toward and away from the latch member 49. To control the position of the carriage 65 it is provided with a transverse notch which receives an eccentric cam 66 rigid with a shaft 67 which is pivotally mounted in the bracket 25 and extends outwardly through the wall of the shell 10 where it is provided with an adjusting knob 68. By rotation of the adjusting knob 68 and shaft 67 through 180°, the carriage 65 can be moved between the full-line and dotted-line positions indicated in Fig. 6. As the carriage moves in response to adjustment of the knob 68, the arm 45 moves with it to vary the position of the notch 47 with respect to the axis 50 of the latch member 49. With the carriage 65 in the full-line position shown in Fig. 5, the strength attained by the brew when the bimetallic strip 55 moves the latch to release position will be relatively weak. As the carriage 65 is moved to the right, the free end of the bimetallic strip 55 must move downwardly a greater distance to effect a latch-release, and the brew will attain a greater strength before the percolating operation is automatically terminated.

We claim as our invention:

1. In a percolator having a vessel adapted to contain liquid and provided in its lower portion with a well, a conduit having its lower end within said well and extending upwardly to an elevated point, a check-valve permitting liquid to flow from the vessel into the well but preventing flow in the reverse direction under the influence of pressure generated in the well, an electrical resistance heating element in close heat-transmitting relationship with the well, main and auxiliary switches for controlling the supply of current to said element, said main switch being biased toward open condition, manually actuable latch means for retaining the main switch closed, means responsive to the temperature of the body of the liquid in said vessel for releasing said latch when such temperature attains a predetermined maximum, a second temperature-responsive means in close heat-receiving relationship to said element and operable to maintain said auxiliary switch open above and closed below a predetermined temperature lower than that existing when liquid in the well has attained its boiling point.

2. The invention set forth in claim 1 with the addition that said second temperature-responsive element is mounted in heat-transmitting engagement with a wall of said well.

3. In combination, a vessel adapted to contain a body of liquid, an electrical resistance heating element in heat-transmitting relationship with a wall of said vessel, a switch for controlling the supply of current to said element, said switch being biased toward open position, a pivotally mounted arm swingable in one direction to close said switch, a latch member movable over a predetermined path into engagement with said arm to retain it in switch-closing position, a support on which said arm is pivotally mounted, said support being movable generally parallel to the path of latch-member movement, manually adjustable means for so moving said support, and means responsive to the temperature of the body of the liquid in said vessel for moving said latch member toward released position.

4. In combination, a vessel adapted to contain a body of liquid, an electrical resistance heating element in heat-transmitting relationship with a wall of said vessel, a switch for controlling the supply of current to said element, said switch being biased toward open position, a pivotally mounted arm swingable in one direction to close said switch, a latch member movable over a predetermined path into engagement with said arm to retain it in switch-closing position, a support on which said arm is pivotally mounted, said support being movable generally parallel to the path of latch-member movement, manually adjustable means for so moving said support, and means in heat-transmitting relationship with the wall of said vessel for moving said latch member toward released position.

References Cited in the file of this patent

UNITED STATES PATENTS

| 1,022,016 | Andrews | Apr. 2, 1912 |
| 1,025,852 | Andrews | May 7, 1912 |
| 2,262,286 | Ireland | Nov. 11, 1941 |
| 2,281,319 | Newell | Apr. 28, 1942 |
| 2,290,660 | Wilcox | July 21, 1942 |
| 2,329,116 | Heilman | Sept. 7, 1943 |
| 2,504,728 | Purpura | Apr. 18, 1950 |
| 2,537,167 | Snyder | Jan. 9, 1951 |
| 2,576,432 | Wilcox | Nov. 27, 1951 |
| 2,611,070 | Chandler | Sept. 16, 1952 |

FOREIGN PATENTS

| 1,016 | Australia | Mar. 4, 1931 |